United States Patent
Katoh

(10) Patent No.: US 10,807,877 B2
(45) Date of Patent: Oct. 20, 2020

(54) INCREASING IONIC CONDUCTIVITY OF LITI2(PS4)3 BY AL DOPING

(71) Applicant: TOYOTA MOTOR EUROPE, Brussels (BE)

(72) Inventor: Yuki Katoh, Brussels (BE)

(73) Assignee: TOYOTA MOTOR EUROPE, Brussels (BE)

(*) Notice: Subject to any disclaimer, the term of this patent is extended or adjusted under 35 U.S.C. 154(b) by 128 days.

(21) Appl. No.: 16/326,117

(22) PCT Filed: Oct. 28, 2016

(86) PCT No.: PCT/EP2016/076151
§ 371 (c)(1),
(2) Date: Feb. 15, 2019

(87) PCT Pub. No.: WO2018/077433
PCT Pub. Date: May 3, 2018

(65) Prior Publication Data
US 2019/0185337 A1 Jun. 20, 2019

(51) Int. Cl.
| H01M 10/00 | (2006.01) |
| C01G 23/00 | (2006.01) |
| H01M 10/0562 | (2010.01) |
| C01B 25/16 | (2006.01) |
| H01M 10/052 | (2010.01) |

(Continued)

(52) U.S. Cl.
CPC .......... *C01G 23/007* (2013.01); *C01B 25/16* (2013.01); *H01M 4/5825* (2013.01); *H01M 10/052* (2013.01); *H01M 10/0562* (2013.01); *C01P 2002/72* (2013.01); *C01P 2006/40* (2013.01); *H01M 10/0525* (2013.01); *H01M 2300/002* (2013.01)

(58) Field of Classification Search
CPC ............ C01B 25/16; H01M 2300/002; H01M 10/052; H01M 4/5825; H01M 10/0562; H01M 10/347; C01P 2006/40; C01P 2002/72; C01G 23/007
See application file for complete search history.

(56) References Cited

U.S. PATENT DOCUMENTS

| 8,697,292 B2 | 4/2014 | Kanno et al. |
| 2014/0148328 A1 | 5/2014 | Castillo |

(Continued)

FOREIGN PATENT DOCUMENTS

| CN | 103401017 A | 11/2013 |
| DE | 10 2011 121 681 A1 | 6/2013 |

(Continued)

OTHER PUBLICATIONS

May 27, 2020 Office Action issued in U.S. Appl. No. 16/325,234.

(Continued)

*Primary Examiner* — Cynthia H Kelly
*Assistant Examiner* — Monique M Wills
(74) *Attorney, Agent, or Firm* — Oliff PLC

(57) ABSTRACT

A compound represented by the general formula $Li_{1+x}Al_xTi_{2-x}(PS_4)_3$, wherein $0.1 \leq x \leq 0.75$. The above compound has been found to have high ionic conductivity. Also, the use of the compound as a solid electrolyte, in particular in an all solid-state lithium battery.

11 Claims, 2 Drawing Sheets

Composition dependence of the ionic conductivity.

(51) Int. Cl.
*H01M 4/58* (2010.01)
*H01M 10/0525* (2010.01)

(56) References Cited

U.S. PATENT DOCUMENTS

| | | | |
|---|---|---|---|
| 2014/0370398 | A1 | 12/2014 | Lee et al. |
| 2015/0280276 | A1* | 10/2015 | Lemke .................. H01M 4/587 |
| | | | 361/679.55 |
| 2016/0149215 | A1 | 5/2016 | Shim et al. |
| 2016/0156021 | A1 | 6/2016 | Aihara et al. |
| 2016/0233539 | A1* | 8/2016 | Sastry ............... H01M 10/0431 |
| 2016/0372785 | A1 | 12/2016 | Jang et al. |
| 2017/0170477 | A1 | 6/2017 | Sakshaug et al. |
| 2017/0229734 | A1 | 8/2017 | Furukawa et al. |

FOREIGN PATENT DOCUMENTS

| | | |
|---|---|---|
| EP | 1466865 A1 | 10/2004 |
| EP | 2 555 307 A1 | 2/2013 |
| JP | 2000-109360 A | 4/2000 |
| JP | 2002-284530 A | 10/2002 |
| WO | 2011/118801 A1 | 9/2011 |
| WO | 2014/148432 A1 | 9/2014 |

OTHER PUBLICATIONS

Micro&Nano Technical Bulletin; 2009.
Mar. 10, 2020 Office Action issued in Japanese Patent Application No. 2019-512618.
Feb. 18, 2018 Office Action issued in Japanese Patent Application No. 2019-512619.
Seino et al. "A sulphide lithium super ion conductor is superior to liquid ion conductors for use in rechargeable batteries." Energy & Environmental Science, 2014, vol. 7, pp. 627-631.
Nov. 18, 2016 International Search Report issued in International Patent Application No. PCT/EP2016/070869.
Nov. 18, 2016 Written Opinion issued in International Patent Application No. PCT/EP2016/070869.
Nov. 18, 2016 International Search Report issued in International Patent Application No. PCT/EP2016/070867.
Yi et al. "Spinel $Li_4Ti_{5-x}Zr_xO_{12}$ (0≤x≤0.25) materials as high-performance anode materials for lithium-ion batteries." Journal of Alloys and Compounds, Jan. 16, 2013, vol. 558, pp. 11-17.
Jul. 11, 2017 International Search Report issued in International Patent Application No. PCT/EP2016/076153.
Rao et al. "Influence of $Zr^{4+}$ doping on structural, spectroscopic and conductivity studies of lithium titanium phosphate." Ceramics International, Jun. 2, 2014, vol. 40, No. 9, pp. 13911-13916.
U.S. Appl. No. 16/314,266, filed Dec. 28, 2018 in the name of Katoh et al.
U.S. Appl. No. 16/326,480, filed Feb. 19, 2019 in the name of Katoh.
U.S. Appl. No. 16/325,234, filed Feb. 13, 2019 in the name of Katoh.
Kim et al., "3D Framework Structure of a New Lithium Thiophosphate, $LiTi_2(PS_4)_3$, as Lithium Insertion Hosts," Chem. Mater., 2008, vol. 20, pp. 470-474.
Kim et al., "Lithium Intercalation into $ATi_2(PS_4)_3$ (a=Li, Na, Ag)," Electrochemistry Communications, 2008, vol. 10, pp. 497-501.
Shin et al., "All-Solid-State Rechargeable Lithium Batteries Using $LiTi_2(PS_4)_3$ Cathode with $Li_2S$-$P_2S_5$ Solid Electrolyte," Journal of the Electrochemical Society, 2014, vol. 161, No. 1, A154-A159.
Arbi et al., "Structural Factors That Enhance Lithium Mobility in Fast-Ion $Li_{1+x}Ti_{2-x}Al_x(PO_4)_3$ (0≤x≤0.4) Conductors Investigated by Neutron Diffraction in the Temperature Range 100-500 K," Inorganic Chemistry, 2013, vol. 52, pp. 9290-9296.
Wang et al., "Identifying Li+ ion transport properties of aluminum doped lithium titanium phosphate solid electrolyte at wide temperature range," Solid State Ionics, 2014, vol. 268, pp. 110-116.
Jul. 7, 2017 International Search Report issued in International Patent Application No. PCT/EP2016/076151.

* cited by examiner

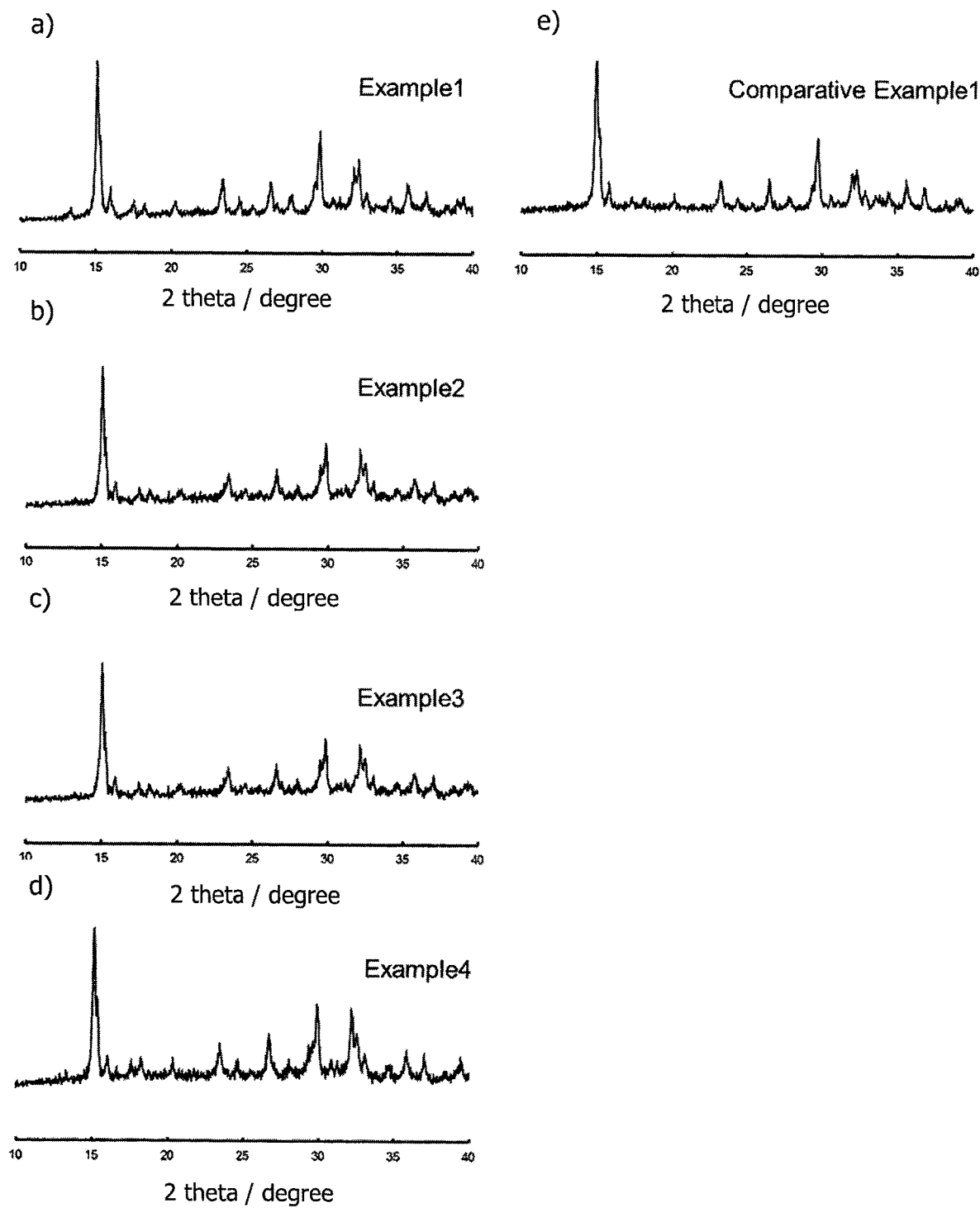
Figure1 XRD patterns

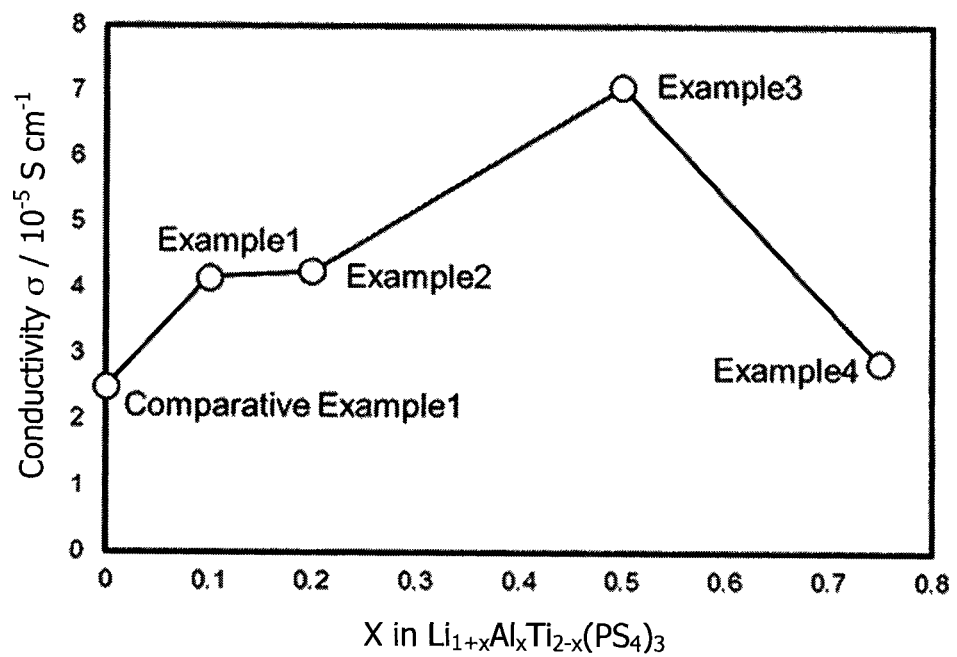
Figure2 Composition dependence of the ionic conductivity.

INCREASING IONIC CONDUCTIVITY OF LITI2(PS4)3 BY AL DOPING

FIELD OF INVENTION

The present invention relates to a method of increasing the ionic conductivity of lithium titanium thiophosphate LiTi$_2$(PS$_4$)$_3$ by Al doping.

BACKGROUND ART

The all-solid-state battery system offers the possibility of high energy density of the battery pack. In order to realize such systems, a solid electrolyte which exhibits high ionic conductivity is demanded. LiTi$_2$(PS$_4$)$_3$ is a candidate for such a solid electrolyte, and has been described in Kim et al., *Chem. Mater.* 2008, 20, 470-474; Kim et al., *Electrochemistry Communications* 10 (2008) 497-501; and Shin et al., *Journal of The Electrochemical Society*, 161 (1) A154-A159 (2014).

According to the method of synthesis described in Kim et al., *Chem. Mater.* 2008, 20, 470-474, a stoichiometric mixture of Li$_2$S, TiS$_2$ and P$_2$S$_5$ is mixed and heated under vacuum according to the following temperature profile:

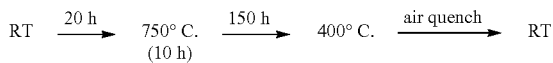

However, the method of preparation proposed in the literature was not optimized with respect to ionic conductivity.

SUMMARY OF THE INVENTION

With a view to solving the above-referenced problems in the preparation of lithium thiophosphate LiTi$_2$(PS$_4$)$_3$, the present inventor has studied different aspects of this material, and this work has led to the achievement of the present invention.

In one aspect, the present invention is thus directed to a compound represented by the general formula Li$_{1+x}$Al$_x$Ti$_{2-x}$(PS$_4$)$_3$, wherein $0.1 \leq x \leq 0.75$.

The above compound of the present invention has been found by the inventor to have high ionic conductivity.

In another aspect, the present invention relates to a method for preparing the compound according to the present invention, comprising the steps of:

(a) providing a mixture of lithium sulfide Li$_2$S, phosphorus sulfide P$_2$S$_5$, aluminum sulfide Al$_2$S$_3$ and titanium sulfide TiS$_2$;

(b) subjecting the mixture prepared in step (a) to a preliminary reaction step through mechanical milling or melt-quenching to produce an intermediate amorphous sulfide mixture;

(c) subjecting the mixture prepared in (b) to a heat treatment step at a maximum plateau temperature of at least 350° C. and less than 500° C.

In still another aspect, the present invention relates to a use of the compound according to the present invention as a solid electrolyte.

BRIEF DESCRIPTION OF THE FIGURES

FIGS. 1(*a*) to 1(*e*) are X-ray diffraction patterns of materials obtained in Examples 1 to 4 and Comparative Example 1 respectively.

FIG. 2 presents the relationship between the ionic conductivity and the composition.

DETAILED DESCRIPTION OF THE INVENTION

In order to solve the above mentioned technical problem, the present invention provides a compound represented by the general formula Li$_{1+x}$Al$_x$Ti$_{2-x}$(PS$_4$)$_3$; wherein $0.1 \leq x \leq 0.75$, preferably $0.3 \leq x \leq 0.6$, more preferably, $0.4 \leq x \leq 0.6$, and most preferably, $x=0.5$.

When the x value is in the above-mentioned ranges and particularly within the preferred ranges, the material has high ionic conductivity.

Without wishing to be bound by theory, the low resistance of LiTi$_2$(PS$_4$)$_3$ might be due to the low content of Li inside the crystal structure. In the compound of the present invention, Ti is substituted aliovalently by Al (Ti$^{4+}$→Li$^{+}$+Al$^{3+}$), which appears to result in an increase in the number of Li without changing the crystal structure, and therefore in an increased ionic conductivity.

Without wishing to be bound by theory, the ionic conductivity is considered to increase by increasing the content of Al inside of the crystal structure (probably because the number of Li is increased as the content of Al is increased), and then decreases above x=0.5 in spite of the increased number of Li and the same crystal structure (probably because too high a level of Li leads to a strong Li—Li interaction).

Compounds according to the invention may be observed to have peaks in positions of 2θ=15.08° (±0.50°), 15.28° (±0.50°), 15.92° (±0.50°), 17.5° (±0.50°), 18.24° (±0.50°), 20.30° (±0.50°), 23.44° (±0.50°), 24.48° (±0.50°), and 26.66° (±0.50°) in an X-ray diffraction measurement using a CuKα line.

<Method of Synthesis>

The Al-doped LiTi$_2$(PS$_4$)$_3$ according to the present invention can be obtained, for example, by a method of synthesis comprising the steps of:

(a) providing a mixture of lithium sulfide Li$_2$S, phosphorus sulfide P$_2$S$_5$, aluminium sulpfde Al$_2$S$_3$ and titanium sulfide TiS$_2$;

(b) subjecting the mixture prepared in step (a) to a preliminary reaction step through mechanical milling or melt-quenching to produce an intermediate amorphous sulfide mixture;

(c) subjecting the mixture prepared in step (b) to a heat treatment step at a maximum plateau temperature of at least 350° C. and less than 500° C.

Here "maximum plateau temperature" refers to the maximum temperature maintained in a heating vessel as commonly used in solid state chemistry, the temperature vs. time profile typically including a gradual ascent phase with a controlled rate of increase of temperature starting from room temperature, a chosen reaction temperature maintained effectively constant over a period of time (the "maximum plateau temperature"), and then a descent phase wherein the temperature is brought back down to room temperature.

The use of the above preferred method allows one to minimize levels of impurity and maximize ionic conductivity.

According to the above preferred method of synthesis of Li$_{1+x}$Al$_x$Ti$_{2-x}$(PS$_4$)$_3$ starting from the sulfides of Li, Ti, Al and P, an intermediate step is used consisting of subjecting the mixture of starting materials to a preliminary reaction step through mechanical milling or melt-quenching to produce an intermediate amorphous sulfide mixture. This intermediate step may also be referred to hereinafter as an "amorphasizing step", and provides amorphous materials derived from $Li_2S$—$TiS_2$—$Al_2S_3$—$P_2S_5$. This amorphous material is able to be heat-treated at over 400° C. without melting. Without the intermediate step, the specimens are melted due to the low melting point of $P_2S_5$ (~270° C.). Elemental phosphorus and sulfur also have lower melting points and will thus melt before the temperatures needed to produce $Li_{1+x}Al_xTi_{2-x}(PS_4)_3$ product in the solid phase reaction. It is considered that the most important effect of the intermediate step is allowing $Li_2S$, $TiS_2Al_2S_3$ and $P_2S_5$ to completely mix and react with each other—the intermediate step may, as well as ensuring intimate physical mixing, begin the chemical transformations which will lead to the final product. The intermediate step may thus act to react the low melting material of $P_2S_5$ with $Li_2S$ (or at least start this reaction).

In terms of starting material mole ratios, the above preferred method of synthesis is appropriately carried out with as close as possible to a stoichiometric ratio thereof in view of the final product $Li_{1+x}Al_xTi_{2-x}(PS_4)_3$ product to be produced. Thus, the lithium sulfide $Li_2S$, phosphorus sulfide $P_2S_5$, aluminium sulfide $Al_2S_3$ and titanium sulfide $TiS_2$ starting materials are generally used in a $Li_2S:P_2S_5:Al_2S_3:TiS_2$ mole ratio of $(1+x):3:x:(4-2x)$.

The amorphous material obtained through the "amorphasizing step" can advantageously be heat-treated at the temperature of $300°$ C.$\leq T \leq 500°$ C. More generally, in heat treatment step (c), the maximum plateau temperature is appropriately not more than 475° C., and preferably at least 375° C., more preferably at least 400° C. and at most 450° C. Further, in heat treatment step (c), the maximum plateau temperature during heat treatment is appropriately maintained for at least 1 hour and at most 300 hours. In terms of the speed of temperature increase going from room temperature up to the maximum plateau temperature, before the heat treatment step, a generally appropriate range is from $0.1°$ C. $min^{-1}$ to $20°$ C. $min^{-1}$. A preferred speed is in the range of $1°$ C. $min^{-1}$ to $5°$ C. $min^{-1}$. Analogous rates of temperature decrease after the heat treatment step, may also be used to bring the sample back down to room temperature.

In the above preferred method of synthesis, each of the method steps (a), (b) and (c) is advantageously carried out under an inert gas, for example, nitrogen or argon, preferably argon.

As mentioned above, the intermediate step (b), also referred to herein as an "amorphasizing step", the intermediate step giving rise to an intermediate amorphous sulfide mixture, may be a carried out by a "melt-quenching" procedure. In an appropriate melt-quenching step, the starting materials are heated to a temperature higher than the melting point of the final product $Li_{1+x}Al_xTi_{2-x}(PS_4)_3$, i.e. to over 700° C. However, in most cases, it is preferable for a sample to be in the equilibrium state before quenching. Therefore, it is appropriate to wait for a relatively longer period and heat up more slowly, for example with a heating rate of $0.05°$ C. $min^{-1}$ to $20°$ C. $min^{-1}$, with a holding time of appropriately 3 hours to 300 hours. To quench the molten mixture, raised to a temperature above 700° C., a rapid cooling rate is used, appropriately between 300 to 1000 K $s^{-1}$, to bring the mixture to room temperature of below. A generally appropriate method for sulfide amorphous materials is ice quenching. A heated quartz tube containing the material to be quenched is placed in ice water.

In preferred embodiments for carrying out the above preferred method, the intermediate step (b), also referred to herein as an "amorphasizing step", the intermediate step giving rise to an intermediate amorphous sulfide mixture, is carried out by a mechanical milling procedure, such as planetary ball milling, vibration milling or jet milling. Where the preferred method of planetary ball milling is used, a generally appropriate ball size range is chosen within the range 1 mm$\leq \phi \leq$10 mm), the temperature range is chosen within the range $0°$ C.$\leq T \leq 60°$ C., the rotation speed is chosen within the range 200 rpm$\leq R \leq$500 rpm, and the duration is chosen within the range 5 h$\leq t \leq$200 h.

<Treatment>

The above preferred method of synthesis can further comprise the following steps of treatment, comprising the steps of:

(d) compressing the lithium aluminium titanium thiophosphate sample provided in step (c) to form a compressed powder layer; and (e) sintering the lithium aluminium titanium thiophosphate obtained as a compressed powder layer in step (d) at a temperature of at least 200° C. and at most 400° C.

The above preferred method of treatment has been found by the inventor to enable higher ionic conductivity to be obtained for this type of material.

From the results obtained by the present inventor, the sintering temperature T range of $200°$ C.$\leq T \leq 400°$ C. is observed to be preferable to obtain high ionic conductivity of $Li_{1+x}Al_xTi_{2-x}(PS_4)_3$. A more preferred range is a temperature of at least 250° C. and at most 375° C. Particularly preferred sintering temperature ranges are from at least 275° C. to at most 375° C.

In the above preferred method of treatment, in step (d), the sample of lithium titanium thiophosphate may preferably be compressed at a pressure range of at least 100 MPa and at most 1500 MPa. The compression step (d) may give rise to samples in pellet form, but the size of the pellets is not important in producing the final effect of increased ionic conductivity.

In the above preferred method of treatment, in step (e), the sintering time is at least 1 hour and at most 300 hours. Here, by "sintering time" reference is made to the plateau temperature maintained in a heating programme. Concerning the temperature vs. time heating profile appropriate before and after reaching the sintering plateau temperature, a generally appropriate heating rate is $0.1°$ C. $min^{-1}$ to $20°$ C. $min^{-1}$. After the sintering time appropriately of 1 hour to 300 hours at the sintering temperature of of $200°$ C.$\leq T \leq 400°$ C., cooling can be carried out by natural cooling or controlled cooling. If the cooling process is controlled, the cooling rate may appropriately be $0.1°$ C. $min^{-1}$ to $100°$ C. $min^{-1}$.

<All Solid-State Lithium Battery>

In a further aspect, the present disclosure relates to an all-solid-state lithium battery comprising the following elements:

a positive electrode active material layer;
a solid electrolyte layer;
a negative electrode active material layer,
wherein the solid electrolyte layer contains an Al-doped lithium titanium thiophosphate $LiTi_2(PS_4)_3$ material produced according to the present invention, and is positioned between the positive electrode active material layer and negative electrode active material layer.

In such an all-solid-state lithium battery, using as solid electrolyte, the $Li_{1+x}Al_xTi_{2-x}(PS_4)_3$ sulfide materials according to the present invention, concerning the form of the solid electrolyte materials, examples include a particle shape, such as the shape of a true ball and the shape of an elliptical ball, or a thin film form, for example. When solid electrolyte materials have a particle shape, as for the mean particle diameter, it is preferable that their size is within the range of 50 nm to 10 micrometers, more preferably within the range of 100 nm to 5 micrometers.

Although it is preferable to have only one or more solid electrolyte materials as mentioned above in a solid electrolyte layer, this layer may also contain a binding agent if needed. As a binding agent used for a solid electrolyte layer, this may be of the same type as mentioned hereunder for the positive active material layer.

As regards the thickness of a solid electrolyte layer, although this may change with the kind of solid electrolyte materials, and the overall composition of an all-solid battery, generally it is preferable that this thickness is within the range of 0.1 micrometer to 1000 micrometers, more preferably within the range of 0.1 micrometer to 300 micrometers.

Concerning the positive active material (cathode active material) to be used in the positive electrode (cathode) active material layer, this is not especially limited if the average operating potential becomes more than 4 V (vs. Li/Li$^+$). As an average operating potential of positive active material, this is appropriately more than 4 V (vs. Li/Li$^+$), and it is preferable that it is within the limits of 4.0 V to 6.0 V, still more preferably within the limits of 4.5 V to 5.5 V. The average operating potential can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 4 V (vs. Li/Li$^+$), there is no specific limitation, but it is preferable that the material is an oxide positive active material, which can have a high energy density.

A compound which has the spinel type structure denoted by general formula $LiM_2O_4$ (M is at least one kind of transition metal element), as an example of positive active material, can be mentioned as an example. As regards M of the above-mentioned general formula $LiM_2O_4$, especially if it is a transition metal element, it will not be limited, but it is preferable that it is at least one kind chosen from the group which consists of Ni, Mn, Cr, Co, V, and Ti, for example, and it is more preferable that it is at least one kind chosen from the group which consists of Ni, Mn, and Cr especially. Specifically, $LiCr_{0.05}Ni_{0.50}Mn_{1.45}O_4$, $LiCrMnO_4$, $LiNi_{0.5}Mn_{1.5}O_4$, etc. can be mentioned. The compound which has the olivine type structure denoted by general formula $LiMPO_4$ (M is at least one kind of transition metal element) as other examples of positive active material can be mentioned. M in the above-mentioned general formula will not be limited especially if it is a transition metal element, but it is preferable that it is at least one kind chosen from Mn, Co, Ni, and the group that consists of V, for example, and it is more preferable that it is at least one kind chosen from the group which consists of Mn, Co, and Ni especially. Specifically, $LiMnPO_4$, $LiCoPO_4$, $LiNiPO_4$, etc. can be mentioned. The compound which has the layer structure denoted by general formula $LiMO_2$ (M is at least 1 type of a transition metal element) as other examples of positive active material can be mentioned. Specifically, $LiCoO_2$, $LiNi_{0.5}Mn_{0.5}O_2$ and $LiNi_{0.33}Co_{0.33}Mn_{0.33}O_2$ etc. can be mentioned. As examples other than the positive active material mentioned above, a $Li_2MnO_3$—$LiNi_{1/3}Co_{1/3}Mn_{1/3}O_2$ solid solution, a $Li_2MnO_3$—$LiNi_{0.5}Mn_{1.5}O_2$ solid solution, a $Li_2MnO_3$—$LiFeO_2$ solid solution, etc. can be mentioned.

As regards the form of the positive active material, a particle shape, such as the shape of a true ball and the shape of an elliptical ball, thin film form, etc. can be mentioned, as an example. As for the mean particle diameter, when the positive active material has a particle shape, it is preferable that it is within the size range of 0.1 micrometer to 50 micrometers, for example. As for the content of the positive active material in a positive active material layer, it is preferable that it is in the range of 10% by weight to 99% by weight, for example, more preferably from 20% by weight to 90% by weight.

Concerning the positive active material layer, in addition to the positive active material mentioned above, if needed, the positive active material layer in may contain other materials, for example, solid electrolyte materials etc. As for the content of the solid electrolyte materials in a positive active material layer, it is preferable that this content is 1% by weight to 90% by weight, more preferably 10% by weight to 80% by weight.

Furthermore, a positive active material layer may contain an electrically conductive agent from a viewpoint of improving the conductivity of a positive active material layer, other than the solid electrolyte materials mentioned above. As electrically conductive material, acetylene black, Ketjen-black, a carbon fiber, etc. can be mentioned, for example. A positive active material may also contain a binding agent. As such a binding material (binding agent), fluorine-based binding materials, such as polyvinylidene fluoride (PVDF) and polytetrafluoroethylene (PTFE), etc. can be mentioned, for example.

Although the thickness of a positive active material layer may change according to the kind of all-solid-state battery made, it is generally preferable that it is within the range of 0.1 micrometer to 1000 micrometers.

As regards the negative electrode active material layer, this layer at least contains one or more negative electrode active material(s), and may additionally contain at least one or more of solid electrolyte materials and electrically conductive agents if needed. For all-solid-state lithium batteries, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, meso carbon micro beads (MCMB), highly ordered/oriented pyrolytic graphite (HOPG), hard carbon, soft carbon, etc. can be mentioned as examples. On the other hand, as a metal active material, charges of an alloy, such as Li alloy and Sn—Co—C, In, Al, Si, Sn, etc. can be mentioned as examples. Oxide stock materials, such as $Li_4Ti_5O_{12}$, can be mentioned as examples of other negative electrode active materials.

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 micrometer to 1000 micrometers.

An all-solid-state battery of the present disclosure has at least the positive active material layer, solid electrolyte layer, and negative electrode active material layer which were mentioned above. It further usually has a positive pole collector which collects a positive active material layer, and a negative pole collector which performs current collection of a negative electrode active material layer. As a material of a positive pole collector, for example, SUS (stainless steel), aluminum, nickel, iron, titanium, carbon, etc. can be mentioned, and SUS is especially preferable. On the other hand as a material of a negative pole collector, SUS, copper, nickel, carbon, etc. can be mentioned, for example, and SUS is especially preferable. Concerning the thickness, form, etc. of a positive pole collector and a negative pole collector, the person skilled in the art may choose suitably according to the use of the all-solid-state battery, etc. The cell case used for a common all-solid-state battery can be used, for example, the cell case made from SUS, etc. can be mentioned. The all-solid-state battery may form a power generation element in the inside of an insulating ring.

The all-solid-state battery of the present disclosure can be considered as a chargeable and dischargeable all-solid-state battery in a room temperature environment. Although it may be a primary battery and may be a rechargeable battery, it is especially preferable that it is a rechargeable battery. Concerning the form of the all-solid-state battery, a coin type, a laminated type, cylindrical, a square shape, etc. can be mentioned, as examples.

As regards the manufacturing method of the all-solid-state battery, this is not particularly limited, and common manufacturing methods of all-solid-state batteries can be used. For example, when an all-solid-state battery is in the thin film form, a positive active material layer can be formed on a substrate, and the method of forming a solid electrolyte layer and a negative electrode active material layer in order, and laminating them thereafter etc., may be used.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXAMPLES

The following experimental section illustrates experimentally the practice of the present invention, but the scope of the invention is not to be considered to be limited to the specific examples that follow.

Example 1: x=0.1

Synthesis of Solid Electrolytes
Mixture Step

The solid electrolyte $Li_{1+x}Al_xTi_{2-x}(PS_4)_3$ was synthesized using starting materials $Li_2S$ (Sigma), $TiS_2$ (Sigma), $Al_2S_3$ (Sigma) and $P_2S_5$ (Aldrich). They were mixed at the weight ratio listed in Table 1 below.
Amorphasizing Step The mixed sample was put into the zirconium pot (45 mL) with 18 zirconium balls (Ø10 mm) under Argon. The pot was closed and treated with planetary milling equipment (Fritsch, P7) at 370 rpm for 40 h to obtain the precursor.
Heat Treatment Step The precursor was sealed into the glass tube at the pressure of 30 Pa and then heated at T=400° C. for 8 h.
Measurement of Li Ion Conductance Li ion conductance at a temperature of 25° C. was measured using the sulfide solid electrolyte material obtained. First, 100 mg of the sulfide solid electrolyte material was added to a cylinder made of alumina and pressed at 4 ton/cm$^2$ to form a solid electrolyte layer. The pellet was sandwiched by SUS current collector for measuring impedance spectroscopy.

An impedance gain-phase analyzer manufactured by Bio-logic (VMP3) was used for the measurement as FRA (Frequency Response Analyzer). The measurement was started from a high-frequency range on the conditions of an alternating voltage of 5 mV, a frequency range of 1 Hz to 1 MHz.

The ionic conductivity of Example 1 was 4.2×10$^{-5}$ S/cm.
X-Ray Diffraction Measurement X-ray diffraction measurement (using a CuKα line) was performed by using the sulfide solid electrolyte materials obtained in the Examples and in the Comparative Example. The results are shown in FIG. 1.

For samples prepared according to the Examples, and essentially only the peaks of the type observed for $LiTi_2(PS_4)_3$ were detected.

Example 2: x=0.25

Only the x value was different from Example 1—here, the x value was 0.25. The ionic conductivity of the material produced by Example 2 was 4.3×10$^{-5}$ S/cm. Essentially, only the peaks of the type observed for $LiTi_2(PS_4)_3$ were detected by XRD.

Example 3: x=0.5

Only the x value was different from Example 1—here, the x value was 0.5. The ionic conductivity of the material produced by Example 3 was 7.1×10$^{-5}$ S/cm. Essentially, only the peaks of the type observed for $LiTi_2(PS_4)_3$ were detected by XRD.

Example 4: x=0.75

Only the x value was different from Example 1—here, the x value was 0.75. The ionic conductivity of the material produced by Example 4 was 2.9×10$^{-5}$ S/cm. Essentially, only the peaks of the type observed for $LiTi_2(PS_4)_3$ were detected by XRD.

Comparative Example 1: x=0

Only the x value was different from Example 1—here, the x value was 0. The ionic conductivity of the material produced by Comparative Example was 2.5×10$^{-5}$ S/cm. Essentially, only the peaks of the type observed for $LiTi_2(PS_4)_3$ were detected by XRD.
Composition Optimization From the results of Examples and Comparative Examples presented in FIG. 2, it can be noted that it is possible to obtain a high ionic conductivity of $Li_{1+x}Al_xTi_{2-x}(PS_4)_3$ in the range of 0.1≤x≤0.75.

As shown by Examples 1, 2 and 3, the ionic conductivity was increased by increasing the content of Al inside of the crystal structure. This is thought to be probably because the number of Li was increased as the content of Al was increased.

As shown by Examples 3 and 4, the conductivity was decreased above x=0.5 in spite of the increased number of Li and the same crystal structure. This is thought to be probably because too high a level of Li leads to a strong Li—Li interaction.

TABLE 1

| | weight of starting materials (g) | | | | |
|---|---|---|---|---|---|
| | Example 1 | Example 2 | Example 3 | Example 4 | Comparative Example 1 |
| x | 0.1 | 0.25 | 0.5 | 0.75 | 0 |
| $Li_2S$ | 0.0436 | 0.0498 | 0.0601 | 0.0705 | 0.0396 |
| $P_2S_5$ | 0.5759 | 0.5779 | 0.5815 | 0.5850 | 0.5745 |
| $TiS_2$ | 0.3675 | 0.3397 | 0.2930 | 0.2456 | 0.3859 |
| $Al_2S_3$ | 0.0130 | 0.0325 | 0.0655 | 0.0988 | 0.0000 |

The invention claimed is:

1. A solid electrolyte compound represented by the general formula $Li_{1+x}Al_xTi_{2-x}(PS_4)_3$, wherein $0.1 \leq x \leq 0.75$.

2. The solid electrolyte compound according to claim 1, wherein $0.3 \leq x \leq 0.6$.

3. The solid electrolyte compound according to claim 1, wherein $0.4 \leq x \leq 0.6$.

4. The solid electrolyte compound according to claim 1, wherein $x=0.5$.

5. The solid electrolyte compound according to claim 1, having peaks in positions of $2\theta=15.08°$ ($\pm 0.50°$), $15.28°$ ($\pm 0.50°$), $15.92°$ ($\pm 0.50°$), $17.5°$ ($\pm 0.50°$), $18.24°$ ($\pm 0.50°$), $20.30°$ ($\pm 0.50°$), $23.44°$ ($\pm 0.50°$), $24.48°$ ($\pm 0.50°$), and $26.66°$ ($\pm 0.50°$) in an X-ray diffraction measurement using a CuKα line.

6. Method for preparing the solid electrolyte compound according to claim 1, comprising the steps of:
    (a) providing a mixture of lithium sulfide $Li_2S$, phosphorus sulfide $P_2S_5$, aluminum sulfide $Al_2S_3$ and titanium sulfide $TiS_2$;
    (b) subjecting the mixture prepared in step (a) to a preliminary reaction step through mechanical milling or melt-quenching to produce an intermediate amorphous sulfide mixture;
    (c) subjecting the mixture prepared in (b) to a heat treatment step at a maximum plateau temperature of at least 350° C. and less than 500° C.

7. Method according to claim 6, further comprising the following steps of surface treatment:
    (d) compressing the solid electrolyte compound provided in step (c) to form a compressed powder layer; and
    (e) sintering the solid electrolyte compound obtained as a compressed powder layer in step (d) at a temperature of at least 200° C. and at most 400° C.

8. A method comprising including the solid electrolyte compound according to claim 1 as a solid electrolyte in an all-solid-state battery system.

9. A method comprising including the solid electrolyte compound according to claim 1 as a solid electrolyte in an all solid-state lithium battery.

10. Solid-state battery comprising the solid electrolyte compound according to claim 1 as a solid electrolyte.

11. All-solid state lithium battery comprising the following elements:
    a positive electrode active material layer;
    a solid electrolyte layer;
    a negative electrode active material layer,
    wherein the solid electrolyte layer contains the solid electrolyte compound according to claim 1.

* * * * *